April 7, 1959 C. R. J. DUMOUSSEAU ET AL 2,881,415

SYSTEMS FOR RECORDING AND SELECTING INFORMATION

Filed April 24, 1956

3 Sheets-Sheet 1

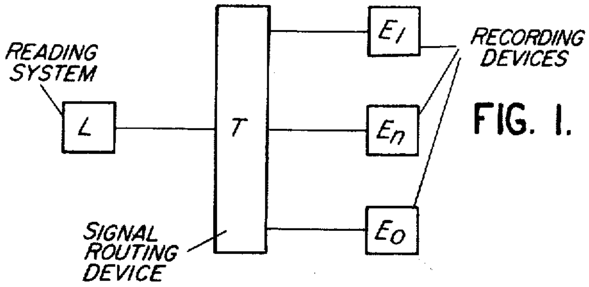

FIG. 1.

FIG. 2.

| LETTERS | STANDARD FIGURES | MODIFIED FIGURES | CODE |
|---|---|---|---|
| A | — | — | + + − − − |
| B | ? | ? | + − − + + |
| C | : | 8 | − + + + − |
| D | If | If | + − − + − |
| E | 3 | : | + − − − − |
| F | É | É | + − + + − |
| G | % | 2 | − + − + + |
| H | H | 5 | − − + − + |
| I | 8 | % | − + + − − |
| J | [illegible] | [illegible] | + + − + − |
| K | ( | ( | + + + + − |
| L | ) | 6 | − + − − + |
| M | . | / | − − + + + |
| N | , | 9 | − − + + − |
| O | 9 | 3 | − − − + + |
| P | 0 | 4 | − + + − + |
| Q | / | H | + + + − + |
| R | 4 | ) | − + − + − |
| S | ' | ' | + − + − − |
| T | 5 | 7 | − − − − + |
| U | 7 | . | + + + − − |
| V | = | 0 | − + + + + |
| W | 2 | , | + + − − + |
| X | / | / | + − + + + |
| Y | 6 | = | + − + − + |
| Z | + | + | + − − − + |
| CARRIAGE RETURN | CARRIAGE RETURN | CARRIAGE RETURN | − − − + − |
| INTERLINE | INTERLINE | INTERLINE | + + − − − |
| LETTER | LETTER | LETTER | + + + + + |
| FIGURE | FIGURE | FIGURE | + + − + + |
| SPACE | SPACE | SPACE | − − + − − |

Inventors
C. R. J. DUMOUSSEAU
A. E. J. CHATELON
By Robert Harding Jr.
Attorney

SYSTEMS FOR RECORDING AND SELECTING INFORMATION

Filed April 24, 1956

3 Sheets-Sheet 2

Inventors
C. R. J. DUMOUSSEAU
A. E. J. CHATELON
By Robert Harding Jr.
Attorney

Inventors
C. R. J. DUMOUSSEAU
A. E. J. CHATELON
By Robert Harding Jr.
Attorney

United States Patent Office 2,881,415

Patented Apr. 7, 1959

2,881,415

SYSTEMS FOR RECORDING AND SELECTING INFORMATION

Claude René Jean Dumousseau and André Edouard Joseph Chatelon, Paris, France, assignors to International Standard Electric Corporation, New York, N.Y., a corporation of Delaware Application April 24, 1956, Serial No. 580,372

10 Claims. (Cl. 340—174)

The present invention relates to information selecting and recording systems, which may be used when information groups each comprising an identifying element—for instance numerical—and which occur at random, must be classified according to a predetermined order, for instance an increasing or decreasing numerical order.

In accounting systems, information groups in any order are provided and comprise, in addition to significant elements intended for being used subsequently, an order or identifying element. One of the problems encountered in such accounting systems involves the grouping of the information associated with the same element or identifying number, for instance, in order subsequently to sum up such elements. Such a problem is met in particular when establishing bills for subscribers to an automatic telephony system, each information group forming an indivisible whole comprising, in addition to information relating to the communication required (date, hour, duration, unit-tax, number asked for), a numerical information element constituted by the subscriber number in the central exchange to which it is connected. When means are provided at the central exchange to record such information, they are evidently available in any order and one must proceed to a selection in such a way that all the communications relating to the same calling subscriber are grouped before establishing the corresponding bill.

One object of the present invention is to provide a simple information selecting system which operates in relation with recording means having a continuous or irregular working, for instance, recording means of the magnetic tape or drum types.

According to one feature of the invention, a message selection system is provided in which each message applied to the system comprises a distinctive character, an identification portion of message, as a function of which the selection has to be made, followed by additional information. The identification portion may comprise several characters, each character having *n* values. Such system comprises, in combination, means for reading the said messages from a recording medium, beginning with the distinctive character preceding the identification portion, means for receiving the said read messages and for recording the said elements of the message temporarily and successively and for supplying a driving impulse in response to each recorded character, means, such as a delay line with multiple leading out connections, adapted to produce from the said driving impulse a series of timing impulses within the interval of time separating the two successive driving impulses, the last of these impulses being used to cause the return to rest of the said temporary recording means, *n* driving devices associated with *n* recording means and adapted, when they are driven or controlled by suitable signals, to cause the recording of the characters successively recorded in the temporary recording devices by means of the associated recording means, means to recognize the said distinctive character and to cause the operation of one of the *n* driving recording means as a function of the value of the character immediately following the distinctive character, the said driving device remaining in this position until receipt of the following distinctive character.

According to another feature of the invention, in such a selection system, means are provided to delay the operation of the recording-devices in such a way as to prevent the recording of the character as a function of which the selection has been controlled, means at the same time being provided for controlling the recording of a distinctive character during the interval of time corresponding to the said character, as a function of which character the selection is effected in such a way as to permit the selection as a function of the second character by applying the recording obtained at the output of the system to the input thereof.

According to another feature of the invention, after the first selection operation, the recordings obtained in the *n* recording devices are successively applied in a manner not shown to the input of the system in a predetermined order, for instance, numerical, and this is repeated as many times as there are characters in the identification part.

According to another feature of the invention, recording means are constituted by recording devices on a tape or a drum, for instance, coated with a magnetic or ferroelectric material, which operate only when the associated driving recording means have been controlled in such a way as to cause a recording.

The above-mentioned and other features and objects of this invention and the manner of attaining them will become more apparent and the invention itself will be best understood by reference to the following description of an embodiment of the invention taken in conjunction with the accompanying drawings, in which:

Fig. 1 represents schematically the selection system of the invention;

Fig. 2 represents a code used for recording information;

Figures 3, 4, 5, 6:
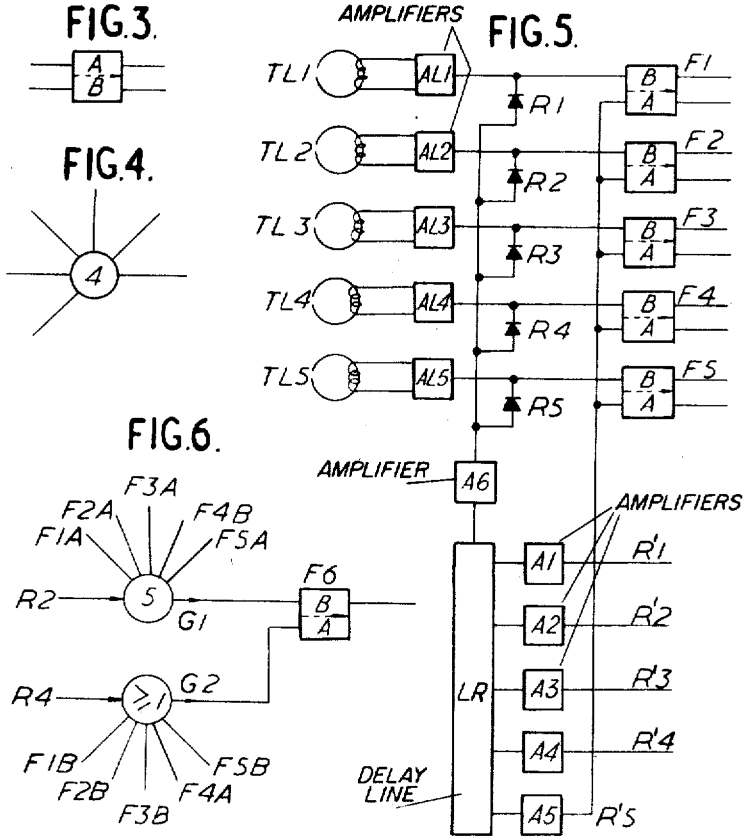
Figs. 3 and 4 represent symbolically electronic elements used in the embodiment.
Figs. 5, 6, 7A to 7D, 8 and 9 represent an embodiment operated in relation with magnetic recording means.
Figures 7A, 7B, 7C, 7D:
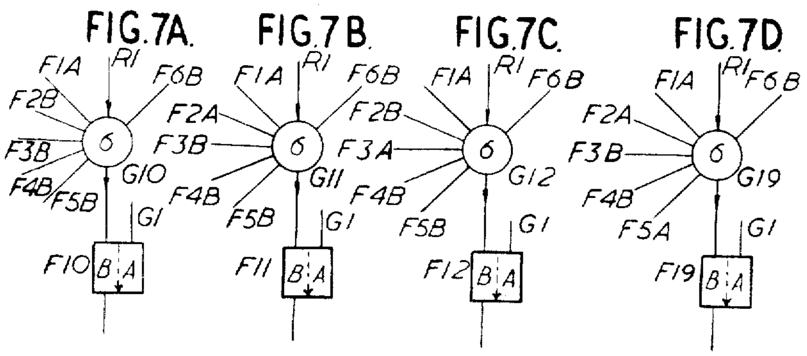

In a general way, the considered system may operate with any recording means in which all the code elements constituting a character present themselves simultaneously to a reading system. More particularly, the case of recording systems has been considered which allow high speed readings and in which the recording is effected by internal modification of the recording material. As examples of recording of this type, the recordings on ferro-electric materials and the recordings on magnetic materials may be mentioned. In Figures 5 to 9 the case of recordings on a magnetic tape comprising five parallel recording tracks has been illustrated. These tracks are not physically materialized, the tape being associated with continuous or intermittent unwinding devices which cause the tape to move in front of five recording or reading heads as the case may be. In a particular embodiment, a magnetic tape is used which is premagnetized in one direction, a signal on a track being constituted by an opposed polarity magnetization.

In Fig. 2 the code used for information recording with the apparatus of Figs. 5 to 9 has been represented. This code is derived from the telegraphic code, called "start-stop," comprising a starting element "start," five significant elements characterizing a character, each element being able to take either one of two values, and a stopping element "stop," indicating the end of the character.

As is well known, the five significant elements furnish 31 different combinations. Two of these combinations: "letter" and "figure" indicate the shifting of the letter keyboard to the figure keyboard in a printing telegraphic system, thus providing 60 different combinations, excluding the character for the change of keyboard. In the system, the code corresponding to letters has been kept, but the code corresponding to figures has been modified, as shown in the third column of Figure 2, for reasons which do not directly relate to the invention, but which facilitate the working of circuits not shown. It will be understood that one could have used either the standard code or any other code with five significant elements in the case of the considered selection circuit. As it is well known in the art, the "start" and "stop" elements are used owing to the fact that the elements present themselves one after the other and it is necessary to define the beginning and the end of the character. As in the considered recording system, the elements constituting a given character present themselves simultaneously to the utilisation system and the code considered is limited to the significant elements. In a general way, in the following description the sign "+" represents a signal on a track and the sign "—" indicates the absence of signal.

In Fig. 1, the rectangle "L" represents a reading system comprising mechanical means for unwinding a tape having five parallel recording tracks which moves in a continuous fashion in front of five reading devices, called "reading heads," each reading head being associated with amplification and signal shaping means. The signals produced by the reading heads are applied to a signal routing device T which routes the signals according to a function of a character towards one of the ten recording devices "E1 . . . E*n* . . . E0." Each of these recording devices comprise five recording heads, associated with a magnetic tape comprising five parallel tracks; but, for economy reasons, the unwinding system is discontinuous and operates only when it is necessary to effect a recording.

Each information comprises, in the order of arrival at the reading head of the device L, a preparatory character which, in the case considered, is "———+—" ("carriage return" of the telegraphic code), a certain number of characters defining the identification number (that is to say the calling subscriber number in the case of an accounting telephone system), then a certain number of characters constituting the information proper and which, in the case of an acounting telephone system, comprise, in particular, elements necessary for determining the tax to be applied to the corresponding telephone communication. In the embodiment considered in Figures 5 and 9, it will be assumed for reasons which will appear later that the digits of the identification number appear in the order: units, tens, hundreds, etc.

The selection mechanism will now be described, and it will be assumed, by way of example, that the identification numbers of the information which must be selected are the following:

6752, 2657, 3684, 8638, 4921, 3153, 2327

The selection is first effected as a function of the unit digit immediately following the preparatory character, the routing device T being arranged in such a way as to route the messages having a unit digit for which the identification number is "1" towards the recording device "$E_1$," those for which the identification number is a "2," towards the recording device "$E_2$" etc. Thus the following distribution is obtained in the different recording devices E1 to En:

| E1 | E2 | E3 | E4 | E7 | E8 |
|---|---|---|---|---|---|
| 4921 | 6752 | 3153 | 3684 | 2657-2327 | 8638 |

The recordings obtained in the different recording-devices "E1 . . . E*n* . . . E0" are then read off in a manner not shown and introduced one after the other and in this order to the reading system "L" and the routing is again effected towards the recording devices E1 to E0 but this time as a function of the tens digit. Then there is obtained in the different recording devices the following distribution:

| E2 | E3 | E5 | E8 |
|---|---|---|---|
| 4921-2327 | 8638 | 6752-3153-2657 | 3684 |

The operation is then performed as a function of the hundred digit, thus giving the following distribution:

| E1 | E3 | E6 | E7 | E9 |
|---|---|---|---|---|
| 3153 | 2327 | 8638-2657-3684 | 6752 | 4921 |

and thereafter as a function of the thousand digit which then gives the final distribution:

| E2 | E3 | E4 | E6 | E8 |
|---|---|---|---|---|
| 2327-2657 | 3153-3684 | 4921 | 6752 | 8638 |

in which, if the information stored is read successively from the recording devices E1 to E0, one finds the information classified in an increasing numerical order of the identification numbers. It is plain that, under these conditions, if several informations possess the same identification number, they are placed side by side in the same recording device.

The selection device represented by schematic blocks in Figure 1 will now be described more in detail in relation to Figures 5 to 9. In these figures, a symbolic mode of representation of the different elementary circuits has been used. In Figure 3 the symbol is shown which is used to designate a flip-flop circuit, that is to say, a circuit possessing two stable positions of equilibrium. The flip-flop circuits used possess two input terminals and two output terminals. Each flip-flop circuit is constituted by a double triode, the anode of each triode being connected, as is well known, to the grid of the other by an RC circuit.

Normally one of the triodes is conducting and the other is blocked. The shift to the second stable position is obtained by applying a negative impulse to the anode of the blocked triode, the application of negative impulses to the anode of the conducting triode being without effect on the circuit. Such a flip-flop circuit has been represented in schematic form, as is shown in Figure 3, by a square divided by a median dotted line bearing an arrow at its extremity, indicating the outputs. Each rectangle, thus identified, represents an element of the flip-flop circuit and possesses an input conductor on the left (Fig. 3) and an output conductor on the right, the output conductor being towards the point of the arrow carried by the median line.

The two elements of the flip-flop circuit have been designated by A and B. The side A is considered as negative from the point of view of output with regard to a reference potential and represents the rest state in all the flip-flop circuits represented in Figures 5 to 9, the side B being positive with regard to the same potential of reference under these conditions. Although they have not been represented, each flip-flip circuit is associated with two separating amplifiers for reasons which will clearly appear to those skilled in the art.

By "electronic gates" is meant elements of circuits being able to present two very different impedances, one in the vicinity of 0, the other in the vicinity of the infinite, according to driving or control signals which are applied.

In a general way, an electronic gate is represented by a circle (Fig. 4), the input being indicated by a radial conductor bearing an arrow the point of which reaches the circle, and the output being indicated by a symmetrical radial conductor bearing an arrow the point of which is directed towards the outside. The control conductor or conductors are indicated by radial conductors which do not bear an arrow. The digit inside the circle indicates the number of control conductors to which a signal must be simultaneously applied to cause the opening of the electronic gate (position in which it presents a low impedance between the input and the output). In a general way, in the particular case considered, all the control signals are negative signals.

In Figure 5 the provisional reading and recording system corresponding to the device "L" in Figure 1 has been represented. The device comprises five reading heads $TL_1$, $TL_2$, $TL_3$, $TL_4$, $TL_5$, respectively associated with five amplifiers $AL_1$ to $AL_5$. Each of these amplifiers comprises means for shaping impulses which are well known in the art. The output signals of each amplifier, such as $AL_1$, are applied to the input B of a corresponding flip-flop circuit $F_1$ which fulfills the role of a temporary recording device. All the output signals of the amplifiers $AL_1$ to $AL_5$ are applied by decoupling rectifiers $R_1$ to $R_5$ in common, to an amplifier *A6* which provides, therefore, an output signal each time that a signal appears on at least one of the five tracks of the recording tape. The output signal of the amplifier *A6* is applied to the input of a delay line LR possessing five taps which are connected to the inputs of five amplifiers A1 . . . A5.

In the example considered, it has been assumed that the successive signals on the recording tracks are separated by 200 microseconds, and, under these conditions, the taps on the delay line are provided with delays respectively of 35, 70, 105, 140 and 175 microseconds. Thus it is understood that each time that a character recorded on the magnetic tape which moves before the reading heads $TL_1$ to $TL_5$ arrives at the level of the head, each track having a signal for this character causes the shifting of the corresponding flip-flop circuit $F_1$ . . . $F_5$ and, at the same time, a signal is applied at the input of the delay line, thus causing the production of impulses at the different taps with the indicated delays, these impulses constituting the timing impulses $R'_1$, $R'_2$, $R'_3$, $R'_4$, and $R'_5$, corresponding to a character.

If the character read on the tape is the preparatory character which, as has been shown above, comprises a signal only on the fourth track, only the flip-flop circuit $F_4$ passes to the position in which the output B is negative, and, under these conditions, the electronic gate $G_1$ (Figure 6), controlled by a negative potential on each of the control conductors $F_1A$, $F_2A$, $F_3A$, $F_4B$, $F_5A$, gives passage to the impulse $R'_2$ towards the input of the flip-flop circuit $F_6$ which comes to the position "B negative."

Figures 9, 10:
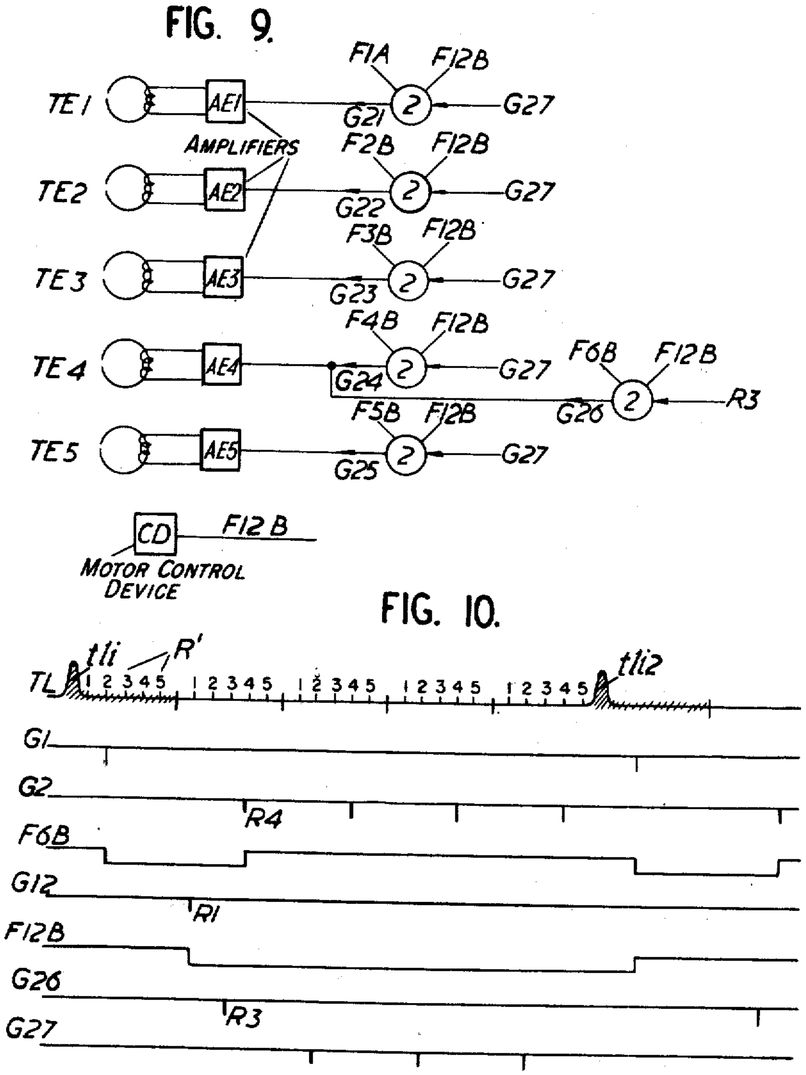
Fig. 10 represents wave shapes used to explain the working of the circuits represented in Figures 5 and 9.

At TL in Figure 10 the successive positions of the different time intervals corresponding to the characters have been represented, together with the time impulses $R'_1$ to $R'_5$ for each character the preparatory characters being indicated by shaded lines, and, at *t1i* the position of the signal of the fourth track. The output signals of the electronic gate $G_1$ have been represented with the same reference and they correspond clearly to the position $R'_2$ of output of the delay line LR.

The wave shape appearing at the output $F_6B$ of the flip-flop circuit $F_6$ has also been represented with the reference $F_6B$. The shifting of the circuit $F_6$ indicates that the routing will have to be effected as a function of the following character which, in this case, is the first or units digit. Other operations which are effected during 200 microseconds of the preliminary character and which concern the end of the previous signal will be described later.

At the end of the interval of time corresponding to the preparatory character, the outgoing impulse $R_5$ is simultaneously applied to all the inputs A of the flip-flop circuits $F_1$ to $F_5$ and causes the return to rest of those of these flip-flop circuits whose position had been modified in function of the signal read, namely $F_4$ in the case under consideration.

The following operation consists in recording the character controlling the routing on one of the ten flip-flop circuits $F_{10}$ to $F_{19}$ (Figures 7A to 7D), only the flip-flop circuits $F_{10}$, $F_{11}$, $F_{12}$, and $F_{19}$ having been shown and corresponding to digits 0, 1, 2, 9. The flip-flop circuits are controlled by their input B by means of the impulses $R_1$ under the control of an electronic gate $G_{10}$, $G_{11}$, $G_{12}$ . . . $G_{19}$ respectively. Each electronic gate is controlled by six signals, namely: a negative output signal from the flip-flop circuit $F_6B$ which indicates the recording of the routing character and a negative output signal of each one of the flip-flop circuits $F_1$ to $F_5$, the choice of the outputs A and B of these circuits being made as a function of the digit controlling the routing. For example, the digit 2 is characterized by a signal on the tracks 2, 4, 5; the reading of the code corresponding to the digit 2 on the track causes therefore the shifting of the circuits $F_2$, $F_4$ and $F_5$ and consequently the electronic gate $G_{12}$ (Fig. 7C) is controlled by $F_1A$, $F_2B$, $F_3A$, $F_4B$, $F_5B$.

It will be assumed by way of example that the digit following the preparatory character is the digit 2. Under these conditions, when the digit 2 is read, the flip-flop circuits $F_2$, $F_4$ and $F_5$ pass to their second (B) position at the same time that an impulse is applied to the input of the delay line LR. All the electronic gates $G_{10}$ . . . $G_{19}$ are blocked except the gate $G_{12}$ and when the impulse $R_1$ appears, the flip-flop circuit $F_{12}$ passes into its second (B) position.

There has been shown in Figure 10 the outgoing signals from the electronic gate $G_{12}$ and the output potential $F_{12}B$ from the flip-flop circuit $F_{12}$. There has been shown in Figure 9 a circuit which is duplicated in each of the recording devices E1 to E0. In this circuit there are a plurality of gates $G_{21}$ to $G_{26}$ controlled by the particular flip-flop, $F_{10}$ to $F_{19}$, which corresponds to the particular recording device E1 to E0 which contains the circuit. The circuit shown in Figure 9 is the one in the recording device E2 in which all the gates are controlled by the flip-flop $F_{12}$. This circuit also has a circuit CD controlled by $F_{12}B$ which is provided in order to cause the movement of the magnetic tape in front of the recording heads $TE_1$ to $TE_5$ when $F_{12}B$ is negative.

The impulse $R_4$ from the delay line LR is applied to the electronic gate $G_2$ (Fig. 6) which operates when there is at least one negative signal on the outputs $F_1B$, $F_2B$, $F_3B$, $F_4A$, $F_5B$; that is to say, when the signal recorded on the flip-flop circuit $F_5$ is not a preparatory signal, and the first impulse obtained at the output of $G_2$ is applied at the input A of the flip-flop circuit $F_6$ which then comes back to rest, the other impulses traversing the circuit $G_2$ being without effect on $F_6$ until the following preparatory signal. The impulse $R_5$ obtained at the fifth output of the delay line LR is applied, as stated above, for setting the flip-flop circuits $F_1$ to $F_5$ back to rest. The following characters which are read must be recorded without modification in the recorder corresponding to the one of the flip-flop circuits $F_{10}$ to $F_{19}$ which has been controlled, namely $F_{12}$ in the case under consideration.

Figure 8:
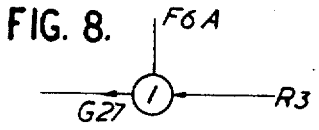

The circuit of Figure 9 which represents the recording equipment of one circuit, such as E2 (Fig. 1) will now be considered. There are ten identical circuits the operation of which is placed under the control of the corresponding flip-flop circuit $F_{10}$ . . . $F_{19}$. The circuit of Figure 8 is common to all the recording circuits and this circuit supplies the recording control impulses, as will be explained later. Each equipment comprises five recording heads $TE_1$ to $TE_5$ associated with five recording amplifiers $AE_1$, $AE_2$, $AE_3$, $AE_4$, $AE_5$ controlled respectively by five electronic gates $G_{21}$, $G_{22}$, $G_{23}$, $G_{24}$, $G_{25}$. However, it will be noted that the recording amplifier $AE_4$ is equally controlled by an electronic gate $G_{26}$ the object of which will be explained later.

The first impulse $R'_3$, after the shifting of $F_{12}$, finds the electronic gate $G_{26}$ open due to the coincidence of $F_6B$ negative and $F_{12}B$ negative, so that a controlling impulse is applied to the recorder $AE_4$ and there is recorded the signal "— — — — + —" which is the preparatory signal. This takes place after the routing signal has been received. When the following character occurs, which character is the one which follows immediately the one controlled by the routing, the impulse $R_3$ finds the electronic gate $G_{26}$ closed, but the electronic gate $G_{27}$ (Fig. 8) is opened, so that an impulse is applied at the input on the electronic gates $G_{21}$ to $G_{25}$. The electronic gates $G_{21}$ to $G_{25}$ are controlled on the one hand by the output B of the corresponding routing flip-flop circuit, namely $F_{12}B$ in the case under consideration, and by the output B of each one of the flip-flop circuits $F_1$ to $F_5$ of the corresponding track; thus $G_{23}$ is controlled by $F_3B$ and $F_{12}B$. A negative signal in $F_{12}B$ indicates the choice of the recorder as a function of the digit which has controlled the routing; a negative signal on the other control of each electronic gate indicates the presence of a signal on the corresponding track. If there is coincidence of the two negative control signals on one electronic gate, the output signal from $G_{27}$ is applied to the corresponding amplifier and there is recorded a signal on the corresponding track; additional signals appearing on the reading track are thus transferred at impulses $R'_1$ which immediately follows the received signal until a new preparatory signal appears.

As soon as a new preparatory signal $t1i_2$ (Fig. 10) appears, it causes the appearance of an impulse at the output of the electronic gate $G_1$, so that $F_6B$ becomes negative. This output impulse is also applied to all the flip-flop circuits, such as $F_{10}$ . . . $F_{19}$ which come back to rest blocking all the recording electronic gates. The circuit is then ready to effect a new routing as a function of the character immediately following the preparatory character.

In the circuit described, the characters as a function of which the selection is made are erased as soon as they are used and it will be understood that in the case in which the characters must be used later for another operation which does not concern the present invention, it is necessary that they appear a second time in the message.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. Information sorting system for sorting successively recorded groups of information items into predetermined categories, said groups being recorded at random and each item in a group having a plurality of simultaneously recorded characters with each group being preceded first by a plurality of simultaneously recorded characters representing a preparatory signal and then by a plurality of simultaneously recorded characters representing a category designation, said system comprising reading means for simultaneously reading each plurality of recorded characters in succession, a plurality of groups of recording means, there being one group for each category and a recording means in each group for each of said plurality of characters, means connected to said reading means and responsive to the simultaneous reading of a plurality of characters for temporarily registering said characters, means connected to said reading means responsive to the reading of a preparatory signal, means connected to said last-mentioned means and to said reading means and controlled by said last-mentioned means for partially preparing connections from said registering means to all said groups of recording means, means responsive to the reading of the next plurality of simultaneously recorded characters representing a category designation for completing said connections from said registering means to the particular group of recording means designated by said category designation and means for thereafter causing said recording means to record the characters registered by said respective registering means, whereby further items of information in the same group read by said reading means will be recorded on said particular group of recording means.

2. Information sorting system, as defined in claim 1, in which the characters are recorded in binary notation, the reading means comprise a plurality of reading devices, one for each character, and the means for temporarily registering said characters comprise a plurality of flip-flop circuits, there being one for each character, said flip-flop circuits being connected respectively to said reading devices.

3. Information sorting system, as defined in claim 2, in which the means responsive to the reading of a preparatory signal comprises a gate having a plurality of control inputs equal to the number of characters in said preparatory signal and means for connecting said control inputs respectively to the flip-flop circuits forming the temporary registering means, the connections being so made that said gate will open only when the preparatory signal has been registered in said flip-flop circuits.

4. Information sorting system, as defined in claim 3, in which the means for completing the connection between the temporary registering means and the particular group of recording means in response to the category designation comprise a plurality of recording group selecting gates, one for each group of recording devices, each gate having a plurality of control inputs connected respectively to the flip-flop circuits for temporarily registering the characters of the signal and an additional input connected to the gate responsive to the preparatory signal, said connections being such that each selecting gate will open only if the characters representing the designation of the group of recording means corresponding to said gate are registered on said flip-flop circuits, a flip-flop circuit connected to each selecting gate and controlled thereby, a plurality of recording control gates for each group of recording means having control inputs connected respectively to said registering flip-flop circuits and additional control inputs connected to one of the flip-flop circuits controlled by said selecting gates, the connections being such that each of said control gates can open only if a signal is registered on the registering flip-flop circuit connected thereto and the selecting gate flip-flop circuits connected thereto is in a predetermined condition, and means for causing the associated recording means to record a character when a recording control gate is opened.

5. Information sorting system, as defined in claim 1, further comprising means responsive to the reading of a character by said reading means for creating a plurality of successive signals prior to the reading of the next character, and means for utilizing said signals to control the means for partially connecting the registering means to the groups of recording means, the means for completing the connection to a particular group of recording means, and the recording of the temporarily registered characters by said recording means.

6. Information sorting system for sorting successively recorded groups of information items into predetermined categories, said groups being recorded at random and each item in a group having a plurality of recorded characters with each group being preceded first by a plurality of recorded characters representing a preparatory signal and then by a plurality of recorded characters representing a category designation, said system comprising reading means for reading each plurality of recorded characters in succession, a plurality of groups of recording means, there being one group for each category and a recording means in each group for each of said plurality of characters, means connected to said reading means and responsive to the reading of a plurality of characters for temporarily registering said characters, means connected to said reading means responsive to the reading of a preparatory signal, means connected to said last-mentioned means and to said reading means and controlled by said last-mentioned means for partially preparing connections from said registering means to all said groups of recording means, means responsive to the reading of the next plurality of recorded characters representing a category designation for completing said connections from said registering means to the particular group of recording means designated by said category designation and means for thereafter causing said recording means to record the characters registered by said respective registering means, whereby further items of information in the same group read by said reading means will be recorded on said particular group of recording means.

7. Information sorting system, as defined in claim 6, in which the characters are recorded in binary notation, the reading means comprise a plurality of reading devices, one for each character, and the means for temporarily registering said characters comprise a plurality of flip-flop circuits, there being one for each character, said flip-flop circuits being connected respectively to said reading devices.

8. Information sorting system, as defined in claim 7, in which the means responsive to the reading of a preparatory signal comprises a gate having a plurality of control inputs equal to the number of characters in said preparatory signal and means for connecting said control inputs respectively to the flip-flop circuits forming the temporary registering means, the connections being so made that said gate will open only when the preparatory signal has been registered in said flip-flop circuits.

9. Information sorting system, as defined in claim 8, in which the means for completing the connection between the temporary registering means and the particular group of recording means in response to the category designation comprise a plurality of recording group selecting gates, one for each group of recording devices, each gate having a plurality of control inputs connected respectively to the flip-flop circuits for temporarily registering the characters of the signal and an additional input connected to the gate responsive to the preparatory signal, said connections being such that each selecting gate will open only if the characters representing the designation of the group of recording means corresponding to said gate are registered on said flip-flop circuits, a flip-flop circuit connected to each selecting gate and controlled thereby, a plurality of recording control gates for each group of recording means having control inputs connected respectively to said registering flip-flop circuits and additional control inputs connected to one of the flip-flop circuits controlled by said selecting gates, the connections being such that each of said control gates can open only if a signal is registered on the registering flip-flop circuits connected thereto and the selecting gate flip-flop circuit connected thereto is in a predetermined condition, and means for causing the associated recording means to record a character when a recording control gate is opened.

10. Information sorting system, as defined in claim 6, further comprising means responsive to the reading of a character by said reading means for creating a plurality of successive signals prior to the reading of the next character, and means for utilizing said signals to control the means for partially connecting the registering means to the groups of recording means, the means for completing the connection to a particular group of recording means, and the recording of the temporarily registered characters by said recording means.

No references cited.